United States Patent [19]
Muscarella et al.

[11] Patent Number: 5,910,201
[45] Date of Patent: Jun. 8, 1999

[54] MULTIPLE SPINDLE SCREW MACHINE

[75] Inventors: Patrick Muscarella; Gary A. Quinter, both of Penfield; David R. Toland, Brockport; James Hugick, Rochester, all of N.Y.

[73] Assignee: Dover Industries, Inc., Rochester, N.Y.

[21] Appl. No.: 08/925,861

[22] Filed: Sep. 9, 1997

[51] Int. Cl.$^6$ .................................................. B23B 13/04
[52] U.S. Cl. ............................... 82/129; 82/138; 82/153; 82/156; 82/162
[58] Field of Search ............................ 82/129, 126, 127, 82/132, 138, 153, 154, 155, 156, 162, 73, 101

[56] References Cited

U.S. PATENT DOCUMENTS

| | | | |
|---|---|---|---|
| 3,744,355 | 7/1973 | Flisch | 82/138 X |
| 3,874,519 | 4/1975 | Mikami | 82/126 X |
| 4,665,781 | 5/1987 | Eichenhofer et al. | 82/129 |
| 5,662,014 | 9/1997 | Link | 82/129 X |
| 5,676,030 | 10/1997 | Crudgington et al. | 82/129 |
| 5,676,031 | 10/1997 | Manning | 82/153 |

*Primary Examiner*—Andrea L. Pitts
*Assistant Examiner*—Henry W. H. Tsai
*Attorney, Agent, or Firm*—Shlesinger, Fitzsimmons & Shlesinger

[57] ABSTRACT

The spindle supporting head of a multiple spindle screw machine is intermittently rotated to place its spindles into successively different angular positions about the axis of a spindle drive shaft which extends coaxially into the center of the head. When each spindle is rotatably indexed into a particular angular position, a piece of bar stock is fed through the spindle and projects beyond one end thereof. Each of a plurality of tool slides, which are mounted adjacent the end of the head from which the spindle projects, carries a tool which registers with the stock projecting from an adjacent spindle. The slides are connected to servo motors which are operable by an associated computer to move their tools toward and away from the stock projecting from the associated spindles. Normally the head is secured against rotation by a hirth ring which intermittently is moved from its locking position to release the head so that it can be rotatably indexed. Each spindle is surrounded by a chuck operating sleeve which causes the associated collet chuck to be opened when the spindle approaches a position immediately preceding its desired angular position, and to be closed when the spindle reaches such position.

11 Claims, 7 Drawing Sheets

MULTIPLE SPINDLE SCREW MACHINE

BACKGROUND OF THE INVENTION

This invention relates to multiple spindle screw machines, and more particularly to an improved such machine which utilizes linear servo motors for effecting certain machine operations previously effected by camming mechanims. More particularly this invention relates to a multiple spindle screw machine of the type which is particularly suitable for operation by a computer.

Multiple spindle screw machines of the type described utilize a variety of attachments for effecting machining operations on pieces of bar stock that project from the work spindles carried by the rotatable spindle indexing head. Heretofore attachments of the type described, for example knurling, threading, cross drilling attachments and the like, have customarily been actuated by cam mechanisms of the type as shown for example in U.S. Pat. No. 3,323,398. Such mechanisms require a considerable amount of manual adjustment in order to effect the desired adjustments or changes in the attachments. In addition, the mechanical camming mechanisms and multiple gear drives of prior such machines have generated a considerable amount of vibration in the machine during its use, and such vibrations tend to interfere with the accuracy of the machine products. Also, considerable time is involved in adjusting the associated gear drive mechanism when it was desired to effect any changes in spindle speeds, thus causing a reduction in the productivity of the machinery.

It is an object of this invention, therefore, to provide an improved multiple spindle screw machine containing an improved spindle drive mechanism which is controlled electronically rather than by gears, thus enabling simple and instant changes in spindle speeds, when desired.

Another object of this invention is to provide a machine of the type described having improved operating mechanisms for the tooling attachments which are utilized for effecting various machining operations on the bar stock supported in the associated tool spindles.

Still a more specific object to this invention is to utilize servo motors for effecting actuation of the associated machine tool attachments and spindles of a machine of the type described, thereby permitting control of these operations by a computer.

In this connection still another object of this invention is to provide an improved multiple spindle screw machine which is operated by computer controlled linear servo motors, thus considerably reducing the down time heretofore experienced with prior art machines of the type which utlized cam operated mechanisms for such purposes.

Another object of this invention is to provide a machine of the type described in which the spindle supporting head and the spindle collet chucks are operated by a common servo motor.

It is an object also of this invention to provide for machines of the type described improved barrel chucking mechanisms for chucking work pieces in the respective machine spindles.

Still another object of this invention is to be provide improved, servo motor operated slide mechanisms for feeding bar stock into the respective spindles of machines of the type described.

Other objects of the invention will be apparent hereinafter from the specification and from the recital of the appended claims, particularly when read in conjunction with accompanying drawings.

SUMMARY OF THE INVENTION

The frame of a multiple spindle screw machine has mounted thereon a polymer concrete bed in which are fixed the lower ends of a spindle housing, and a rotatable spindle drive shaft, which projects coaxially into one end of the housing. Mounted for indexable rotation in the housing coaxially about the drive shaft is a spindle supporting head having rotatably mounted therein, intermediate their ends, a plurality of tubular, work supporting spindles, which are equiangularly and equiradially spaced about the spindle drive shaft, and which are operatively connected to the shaft to be rotated thereby. The head is operatively connected to a servo motor, which responds to signals from an associated computer which intermittently rotates the head to thereby rotate the spindles intermittently and successively into different angularly spaced positions about the axis of the spindle drive shaft. As each spindle approaches one of the above-noted angular positions, the same servo motor which indexes the head, then operates a camming mechanism which causes a barrel chucking mechanism associated with the collet of each spindle, to cause the collet to open, after which another servo motor causes a piece of work to be advanced through the now-opened collet of the associated spindle until the work strikes a stop plate positioned adjacent one end of the head. When the last-named spindle is advanced to its next angular position by the first-named servo motor, that motor functions also through the associated barrel chucking mechanism to close the associated collet over the newly advanced piece of work.

Mounted on the frame adjacent the ends of the collets from which the pieces of work project, is a plurality of tool slide mechanisms which are angularly spaced about the axes of the head so that the tool of each such slide mechanism registers with the projecting end of the workpiece in a different one of the associated spindles. Each time the spindles are indexed into new angular positions, a further plurality of servo motors, each of which is connected to a different one of the tool slide mechanisms, is operated by a system computer to advance its associated tool toward and away from the projecting end of the adjacent workpiece in order to perform a working operation thereon. Also, each time the head is indexed into a new angular position, a Hirth coupling ring set, which is interposed between the head and the housing in which the head rotates, is operated to lock the head against any further rotation once it has been advanced into one of its angular positions of rest. After a tooling operation has been performed on the projecting end of each piece of work, the Hirth coupling ring set is operated by a hydraulic mechanism in order to momentarily release the head for indexable rotation into a new position.

DRAWINGS

FIGS. 1A and 1B taken together constitute a fragmentary side elevational view of part of an improved multiple spindle screw machine made in accordance with one embodiment of this invention, portions of the machine being shown in section and other portions thereof being deleted from this figure for purposes of simplification;

DETAILED DESCRIPTION OF THE PREFERRED EMBODIMENT

Figure 1A:
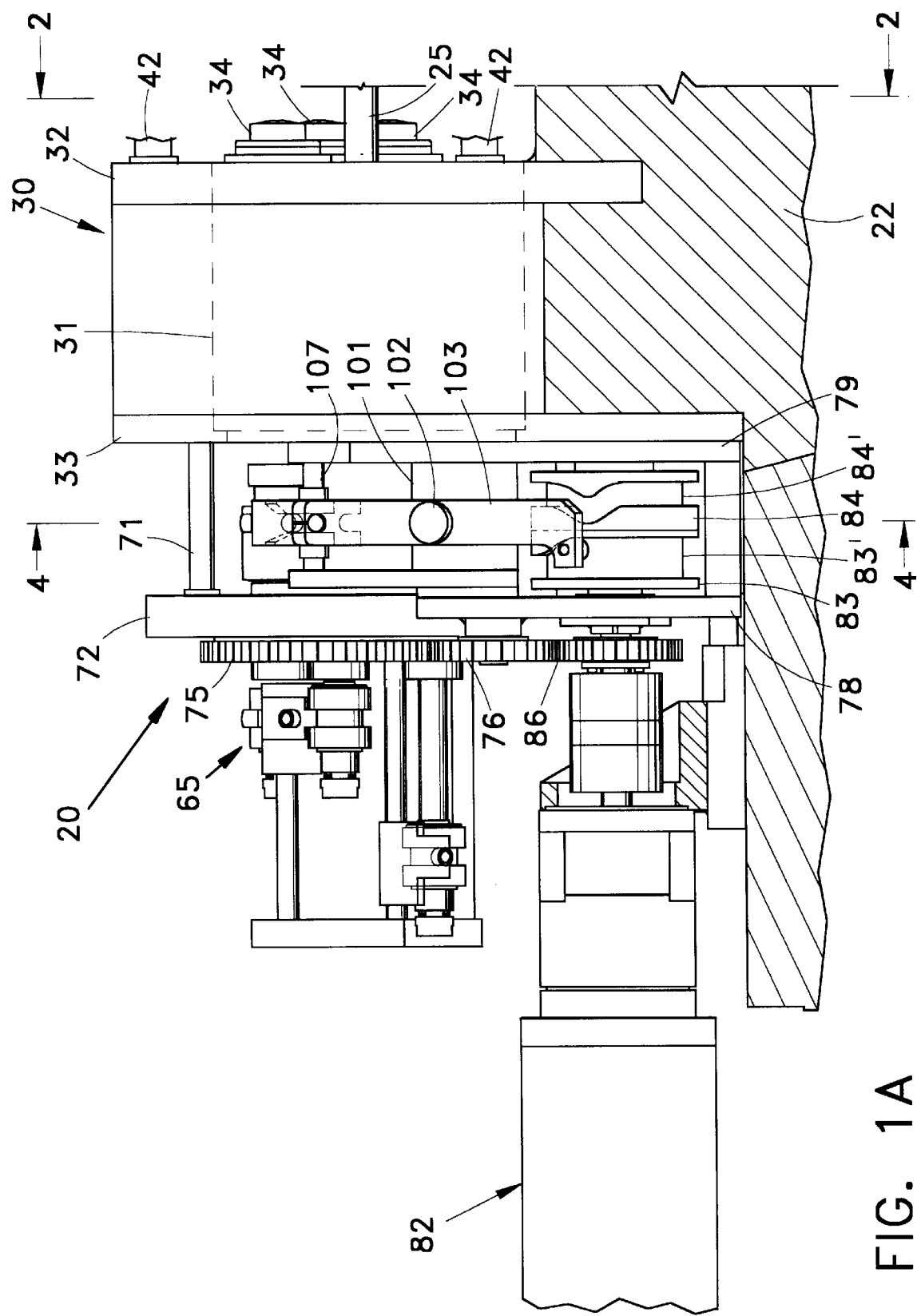
Figure 1B:
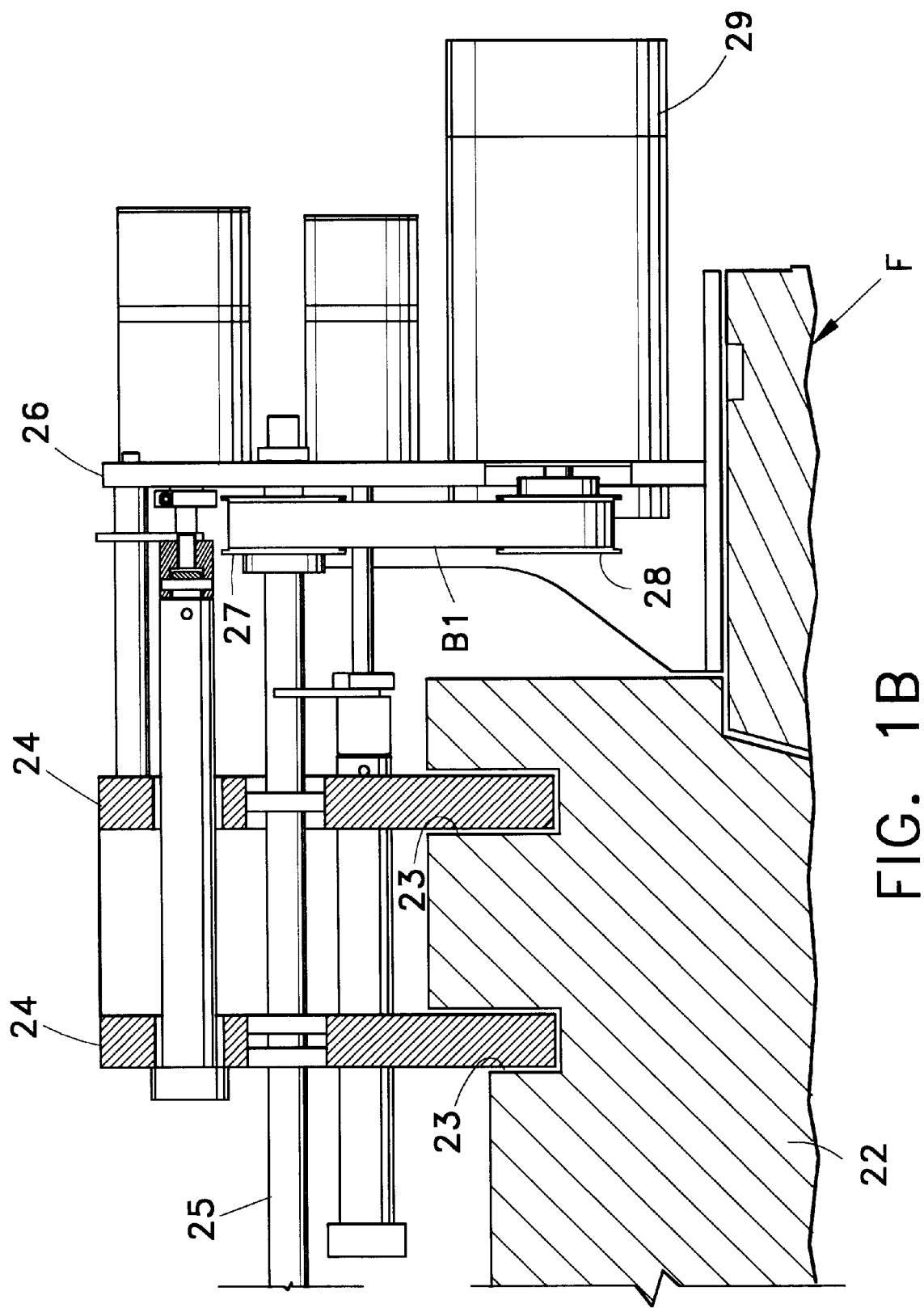

Referring now to the drawings by numerals of reference, 20 denotes generally a multiple spindle screw machine having supported on its frame F a polymer concrete bed 22 having in its upper surface a pair of spaced, parallel grooves 23 in which are secured by epoxy glue, or the like, the lower ends of a pair of spaced, parallel support plates 24. Rotatably journaled intermediate its ends in registering openings in the plates 24 is an elongage spindle drive shaft 25, one end of which, the right end as shown in FIG. 1 is rotatably journaled in an opening in another support plate 26 which is secured to and projects above the upper surface of the frame F adjacent one side of the bed 22. Secured to shaft 25 coaxially thereof adjacent the inside surface of plate 26 is a spool 27 which is connected by a drive belt B1 to another spool 28 which is fastened coaxially to the drive shaft of a spindle drive motor 29, which is secured to the outer face of the plate 26. As noted hereinafter, motor 29 is operable selectively to rotate the drive spindle 25 via the belt B1.

Figure 3:
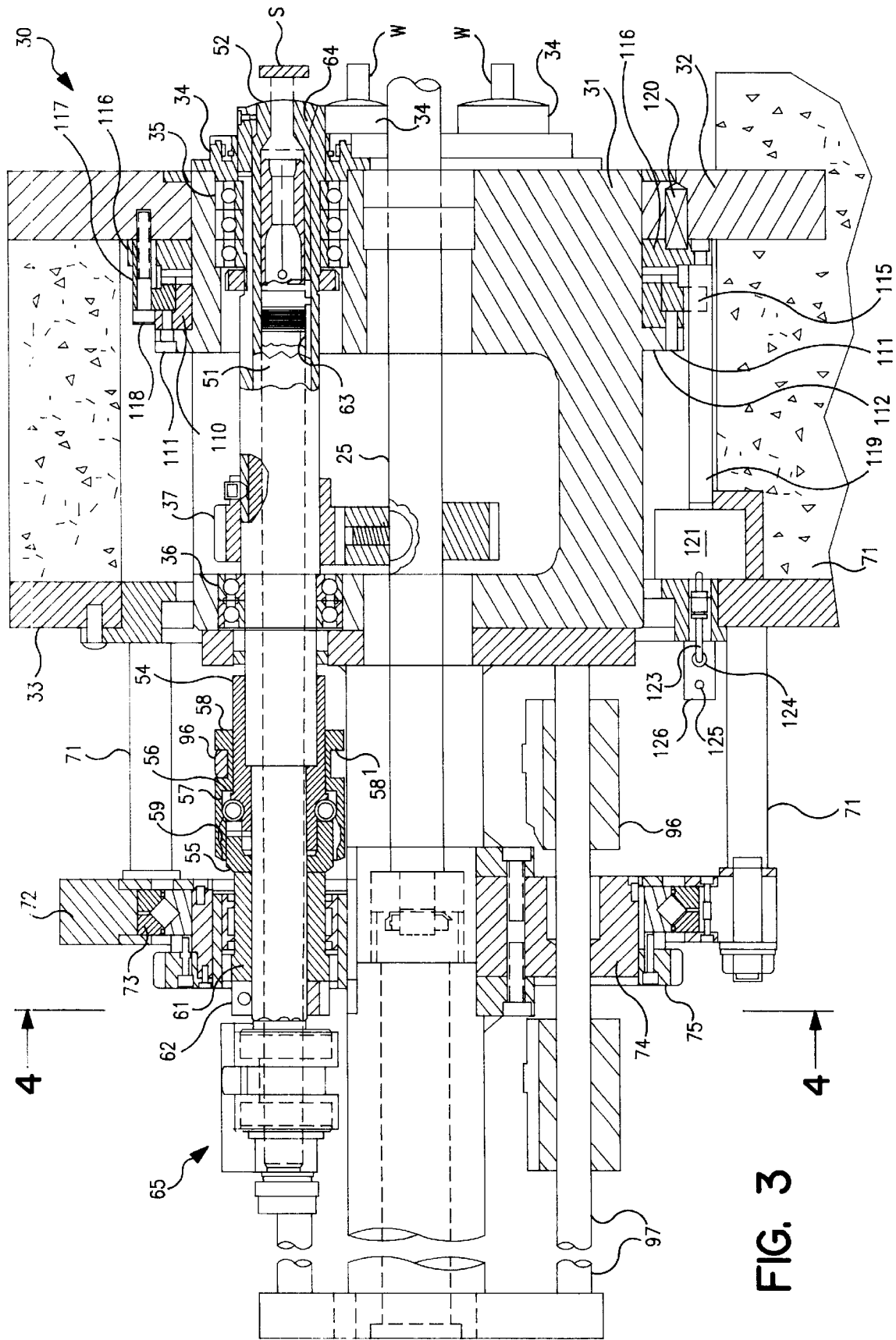
FIG. 3 is an enlarged, fragmentary sectional view taken generally along the line 3—3 in FIG. 2 looking in the direction of the arrows, but excluding the tooling attachments.

At its opposite or left end (FIG. 1) the drive shaft 25 extends through a spindle housing 30 coaxially of a revolving head 31, which is rotatably supported at opposite ends thereof in the end walls 32 and 33 of housing 30 for indexable rotation coaxially about shaft 25. Each of five, tubular, outer spindles 34 is rotatably journaled intermediate its ends in roller bearings 35 and 36 (FIG. 3) in the forward and rear ends of head 31 (the right and left ends thereof as shown in FIGS. 1 and 3) for rotation about spaced, parallel axes equiangularly spaced about, and equispaced radially from the axis of head 31. Secured to each of the outer spindles 34 for rotation thereby in the housing 30 is a spur gear 37, only one of which is shown in FIG. 3. Each gear 37 has the teeth thereof meshing with a common drive gear 38, which is secured to the spindle drive shaft for rotation thereby in housing 30. The teeth of gear 38, therefore, mesh with the teeth of each of the five spur gears 37 carried by the outer spindles 34, so that upon rotation of drive shaft 25 each of the spindles 34 is rotated coaxially about its respective axis.

Figure 2:
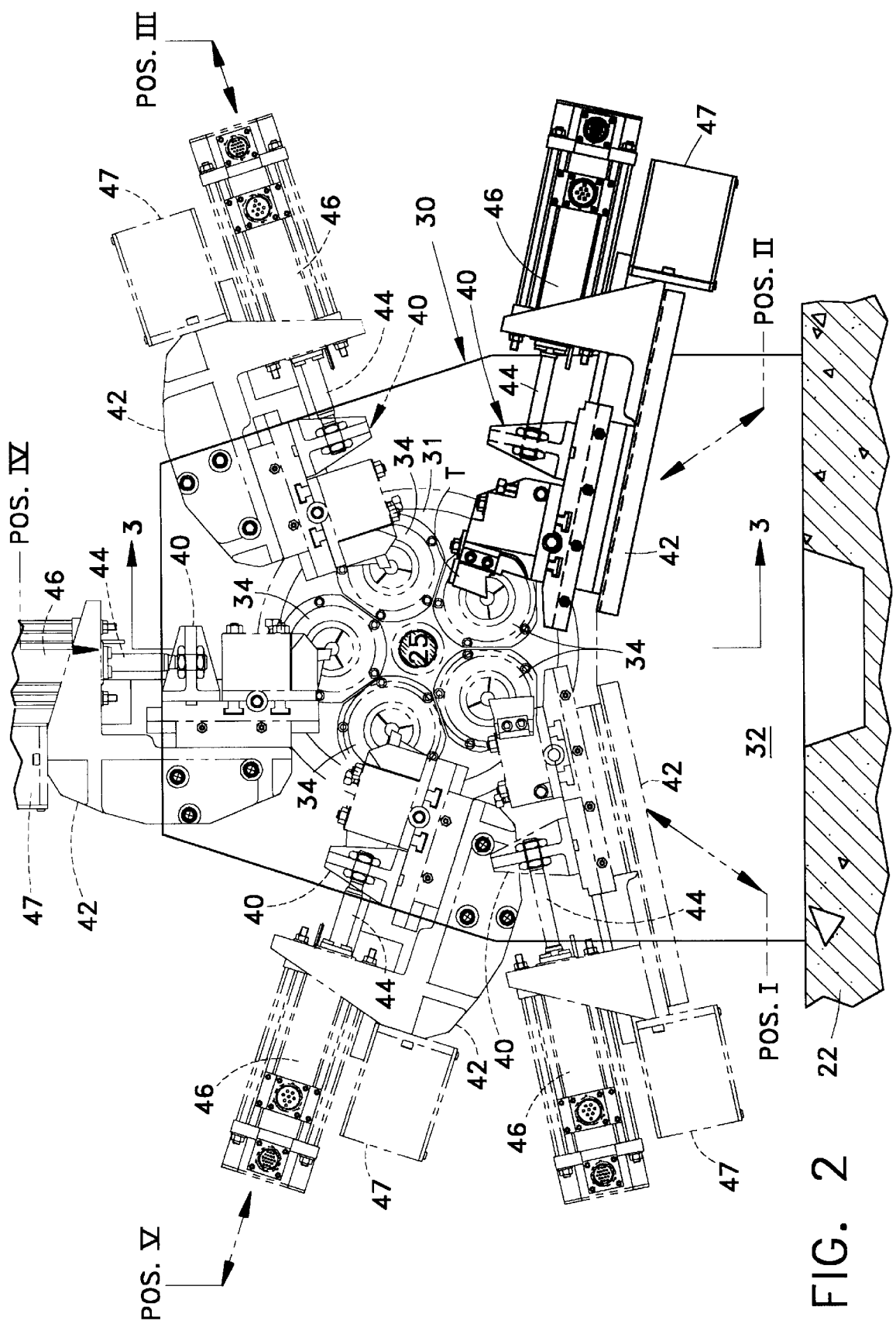
FIG. 2 is an enlarged cross sectional view taken generally along the line 2—2 in FIG. 1 looking in the direction of the arrows, but illustrating also various tooling attachments not shown in FIG. 1.

As shown more clearly in FIG. 2, the five outer spindles 34 are equi-angularly spaced about, and equi-radially spaced from, the drive shaft 25. As noted in greater detail hereinafter, the head 31 is disposed to be intermittently rotated one-fifth of a revolution about its axis, thus rotatably indexing each of the spindles 34 counterclockwise in 32, and successively into each of five different positions of rest, which are denoted in FIG. 2 at POS.I through POS.V. In each such position the work W (broken lines in FIG. 3) that projects from a respective spindle 34 is placed in registry with one of the tools T carried by one of five cross slides 40, which are mounted for reciprocable, sliding movement transversely of an associated spindle 34 on brackets 42, which are bolted or otherwise secured at the face of the end wall 32 at angularly spaced points about the axis of head 31.

Each slide 40 is reciprocated on its associated bracket 42 by the shaft 44 of a linear servo motor 46. Since the motors 46 and the slides 40 operated thereby are generally similar in construction, only one such motor and slide, and associated tool T has been shown in full lines in FIG. 2, the remaining motors and associated tools being shown in phantom by broken lines in FIG. 2. As noted in greater detail hereinafter, the motors 46 retract the associated tools T before the head 31 is rotatably indexed, and then after the head has reached an indexed position, the motors 46 are operated to engage the associated tools T with the work W of the adjacent spindle 34. To monitor the position of each slide 40 relative to the work W, each motor 46 has associated therewith a sensor index 47 which, as noted in greater detail hereinafter, includes three proximity switches for detecting the high, low and home positions of the associated slide 40.

Referring again to FIG. 3, each outer spindle 34 has mounted for limited coaxial movement therein an inner, collet supporting spindle 51 having removably threaded in its forward end a flexible collet chuck 52. At its rear or left end as shown in FIG. 3 each spindle 51 is secured coaxially in one end of an inner, barrel chucking sleeve 54, the opposite end of which projects coaxially and slidably into one end a barrel chucking cage 55. Intermediate its ends the inner sleeve 54 has formed thereon an integral, annular collar 56 having an inclined camming surface confronting upon a plurality of cylindrical camming detents 57 carried in angularly-spaced recesses formed in the end of the cage 55 which confronts upon collar 56. An annular chuck closing sleeve 58, which surrounds the overlapping ends of sleeve 54 and the cage 55, is mounted for limited axial movement relative to sleeve 54 into and out of a chuck closing position as shown in FIG. 3. In this position the spherical detents 57 have been urged by the inner peripheral surface of the sleeve 58 radially inwardly into a chuck closing position in which the detents are seated against the inclined camming surface on the collar 56. As noted hereinafter, when the sleeve 58 is shifted axially toward the right from the position as shown in FIG. 3, an annular recess 59 in the inner peripheral surface of the sleeve 58 is shifted axially into a position in which it registers with the detents 57, thus permitting the detents to shift radially outwardly into the recess 59 in sleeve 58. When this occurs the cage 55 is permitted to shift slightly axially toward the right in FIG. 3, and in so doing permits the inner chucking sleeve 51 also to shift slightly axially toward the right in FIG. 3 relative to the outer spindle 34, thus permitting the chuck 52 to expand into its open or work releasing position, as noted in greater detail hereinafter.

At its end remote from its detents 57, the ball cage 55 engages one end of a spacer sleeve 61, the opposite end of which is engaged by nut 62 which is threaded on the inner end (left end in FIG. 3) of the inner spindle 51, so that when cage 55 is shifted axially in response to the radial movement of the ball detents 57, this axial movement is imparted by sleeve 61 and the nut 62 to the inner spindle 51. This axial movement of the chucking sleeve 51 is relative to an elongate bar stock feed tube 63, which is mounted coaxially within the chucking spindle 51. Sleeve 63 has a collet 64 formed at one end (the right end in FIG. 3), and projects at its opposite end beyond the inner end (left end in FIG. 3) of the spindle 51, and into a feed slide assembly, which is denoted generally by the numeral 65, and which will be described in greater detail hereinafter.

Secured in spaced, confronting relation to the rear wall 33 of housing 30 by a plurality of elongate bolts 71 (FIGS. 1, 3 and 4) is a stationary plate or housing 72 having therethrough a central opening disposed coaxially of the head 31.

Mounted by a thrust bearing 73 coaxially in the center opening in plate 72 is a head supporting plate or housing 74. Secured coaxially to the side of housing 74 remote from the head 31 is a head indexing gear 75, the teeth of which mesh with an intermediate, idler gear 76 (FIGS. 5 and 6), which rotates on a stub shaft 77 that projects from one of two spaced, parallel cam supporting walls 78 and 79, which are fixed to the rear wall 33 of housing 30 beneath and adjacent to one side of the head supporting plate or housing 72. Rotatably mounted ajacent opposite ends thereof in the support walls 78 and 79 to extend parallel to the stub shaft 77 is a cam shaft 81 (FIGS. 4 to 6) which is adapted to be driven by a rotary servo motor identified generally by the numeral 82 in FIGS. 1 and 5. Secured to shaft 81 for rotation thereby between the support plates 78 and 79 are two circular cams 83 and 84, respectively, the former of which is employed to effect the opening of a collet chuck 52 of a respective spindle 51, and the latter of which operates, as noted hereinafter, to effect the closing of a collet chuck 52. Between the plate 78 and the rotary servo drive 82, shaft 81 has secured thereon a head driving gear 86, the teeth of which mesh with the idler gear 76, thereby to impart rotation to the gear 75, and hence the head 31, when the servo motor is energized as noted hereinafter.

Figure 4:
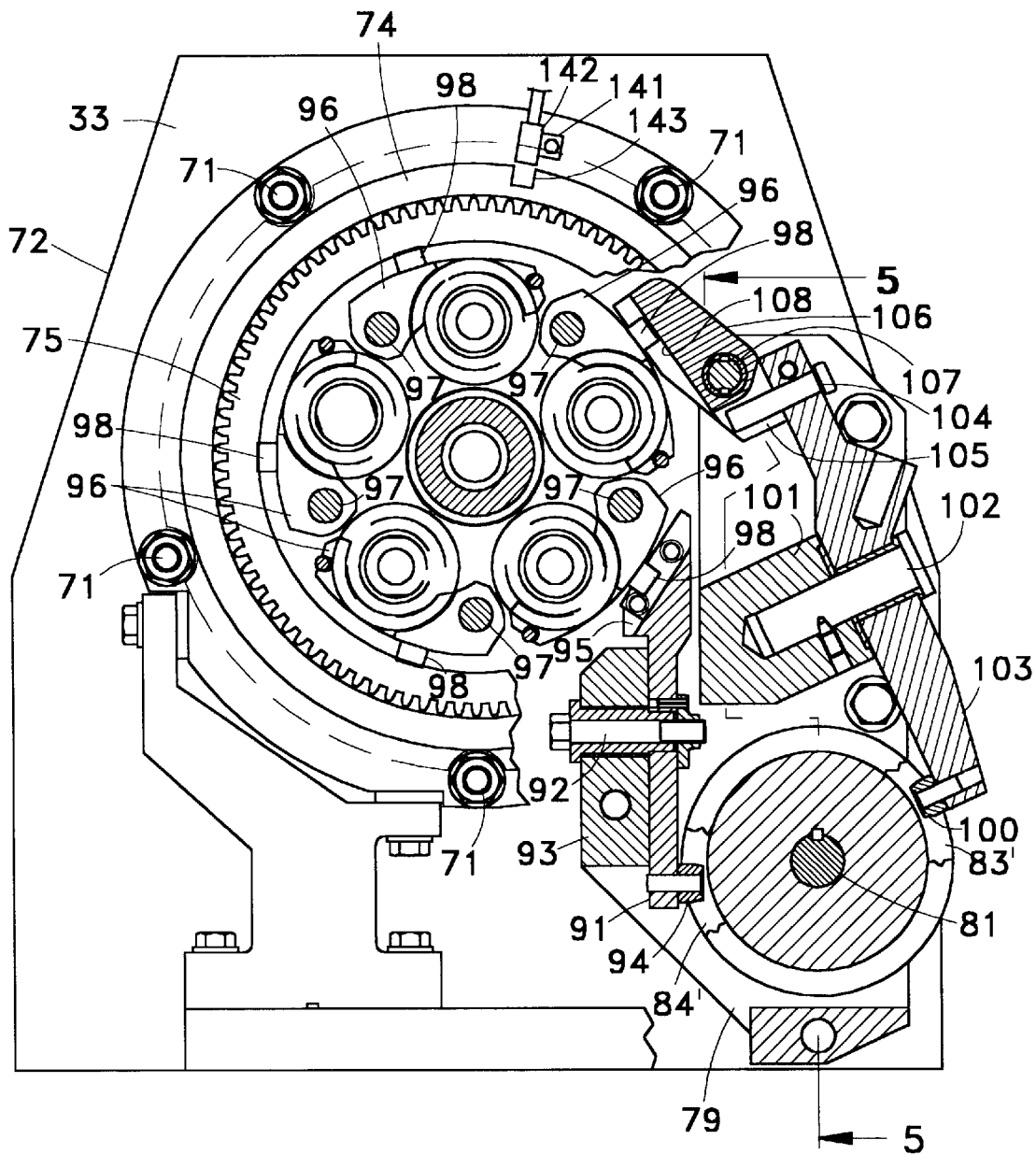
FIG. 4 is a sectional view on a reduced scale taken generally along the line 4—4 in FIG. 3 looking in the direction of the arrows.

Referring to FIG. 4, wherein gear 75 and the head support plate 74 are cut away in part to illustrate the chuck opening and closing mechanisms, a cam follower arm or lever 91 is mounted intermediate its ends to pivot on a pin 92, which is secured in a bracket 93 that projects from the stationary wall 79. Arm 91 carries at one end thereof (the lower end as shown in FIG. 4) a roller cam follower 94, which rolls in the camming slot or groove 84' in cam 84 thereby to effect pivotal movement of the arm 91 about an axis extending transverse to the cam shaft 81, when the latter is rotated. The opposite, upper end of the lever arm 91 has therein a slot 95 disposed to register successively with each of five different, arcuate slide chucks 96, each of which is mounted at one end thereof on one of five, parallel support shafts 97, which are secured at one end to the head 31 at equi-angularly spaced points about the axis thereof, and which project at their opposite ends through the head supporting wall or plate 74. Intermediate its ends each cam slide 96 seats, as shown in FIG. 3, in an annular recess 58' formed in the outer peripheral surface of each chuck closing sleeve 58. Moreover, each slide 96 has projecting from the outer peripheral surface thereof an integral, cylindrical pin follower 98, which is disposed to enter into the slot 95 in arm 91 as the head is rotatably indexed (clockwise in FIG. 4) from its fifth to its first position.

Also mounted on another bracket 101 which projects from plate 79, and for pivotal movement about a pin 102 which extends transversely of the cam shaft 81, is another lever or cam follower arm 103, which functions to open the collet 52 of a respective spindle 51 as the latter is rotatably indexed (again clockwise in FIG. 4) from its fourth to its fifth position. For this purpose lever 103 has rotatably mounted on one end thereof a roller 100, which rolls or slides in a cam track or groove 83' that is formed in the outer peripheral surface of cam 83. In its opposite or upper end (FIG. 4) lever 103 carries a pin 104 that projects into a slot 105 formed at one end (the lower end in FIG. 4) of a cam follower 106, which is mounted intermediate its ends for axial sliding movement on a shaft 107, which projects from plate 79 parallel to the cam shaft 81. At its opposite, upper end the cam follower 106 has therein an elongate slot or groove 108, which like the groove 95 in arm 91, is disposed to have the head or projection 98 of each cam slide 96 enter the slot 108 as the head 31 rotatably indexes a respective spindle 34 and its associated cam slide 96 from position 4 to position 5 of the head. When the projection 98 of a respective slide 96 enters the slot 108, the camming arm 103, in response to the cam slot 83' in cam 83 causes the follower arm 106 to be shifted slightly in an axial direction on the shaft 107, and in turn correspondingly shifts the associated slide 96 and the outer camming sleeve 58 to which it is connected, in a direction to effect the opening of the collet 52 of the associated spindle 51.

Figure 7:
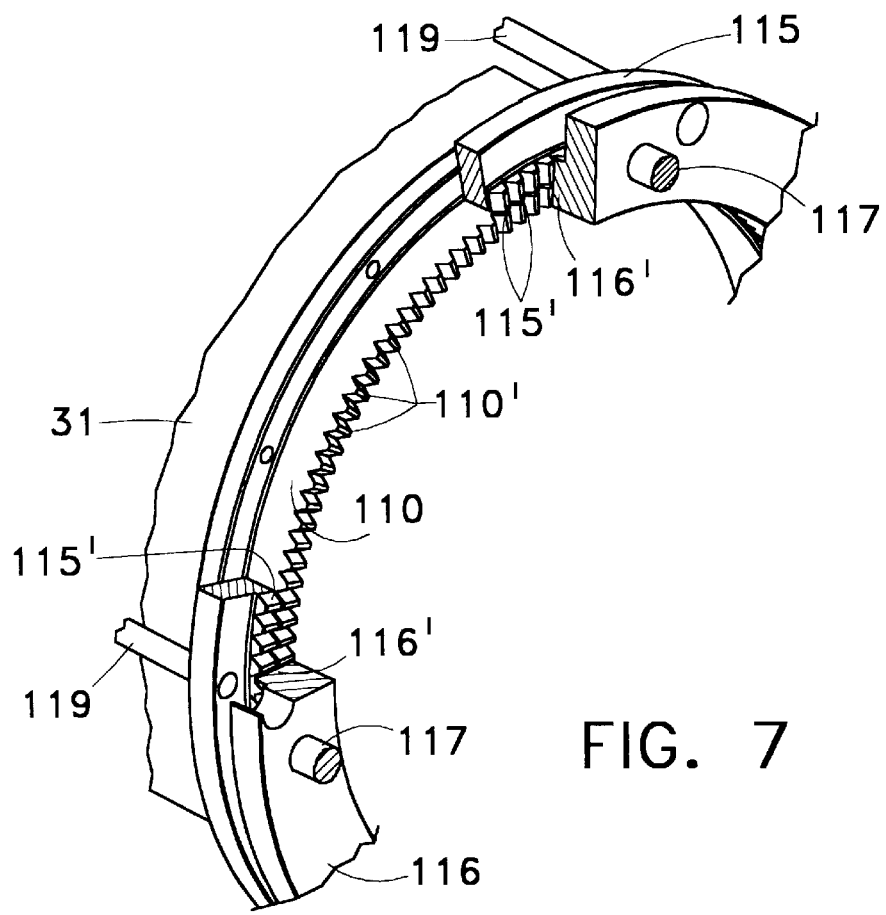
FIG. 7 is a fragmentary perspective of the head locking mechanism.

After the head 31 has been rotatably indexed into one of its five stationary positions, it can be locked against further rotation by a ring set including a first ring 110 (FIGS. 3 and 7) which is secured by a plurality of bolts 111 to an external, annular flange 112 formed coaxially on head 31 adjacent its forward end, thereby placing a plurality of teeth 110' (FIG. 7) which are formed on one end of the ring 110 (the right end in FIG. 3) in axially spaced, confronting relation to the inside surface of the front housing wall 32. Intermediate its ends the ring 110 is surrounded coaxially by another ring 115, which is fixed against rotation in the polymer bed 22, and which has formed on its outer end (the right end in FIG. 3) a plurality of spaced teeth 115' (FIG. 7) which register with the teeth 110' carried by the indexible head 31. The two sets of teeth 110' and 115' register with a single, but larger set of teeth 116' (FIG. 7), which are formed on one end (the left end in FIG. 3) of a hirth ring 116, which also surrounds the head 31 coaxially thereof adjacent housing wall 32. The teeth 116' of ring 116 confront upon and are disposed to mesh with both sets of teeth 110' and 115' as noted hereinafter.

Ring 116 is mounted for limited axial movement on head 31 by a plurality of spacer sleeves 117 (FIGS. 3 and 7), which projects slidably through registering openings in the ring 116, and which are secured to the housing wall 32 by a plurality of bolts 118, only one of which is shown in FIG. 3. The bolts 118 thus secure the hirth ring 116 against rotation in the housing 30 but permit limited axial movement of the ring 116 toward and away from the rings 110 and 115, and their associated teeth. For the purpose of shifting it axially on head 31, the ring 116 is secured at various points around its periphery to one end of each of a series of angularly spaced operating rods 119, each of which is secured at one end to ring 116, as shown in FIG. 3, and which projects at its opposite end into a hydraulic cylinder 121, only one of which cylinders is shown in FIG. 3. It will be understood, however, that a plurality of such cylinders 121 are secured to the inside surface of the housing wall 33, as shown in FIG. 3, but at angularly spaced points coaxially around the outside of head 31. Each hydraulic cylinder 121, as noted hereinafter, operates to shift its associated rod 119 to a head unlocking position, as shown in FIG. 3, wherein each rod 119 is advanced toward the right in FIG. 3 to cause the hirth ring 116 to be shifted toward the right against the resistance of a series of springs 120, only one of which is shown in FIG. 3, and into a position in which it is substantially engaged with the inside surface of the housing wall 32. At this stage, the teeth 116' of the hirth ring 116, each of which teeth is twice as long as the respective teeth 110' and 115', is slightly spaced from or disengaged from the teeth 110' and 115', so that the head 31 can then be rotatably indexed relative to both the stationary ring 115 and the hirth ring 116. At such time—i.e., when the hirth ring 116 is in its head releasing or unlocking position, a reduced-diameter stem 123, which is connected to the operating piston of each hydraulic cylinder 121, projects through a registering opening in the rear wall 33 of the housing 30, and into the path of one of two proximity switches 124 and 125, which are mounted in a housing 126 that is fastened to the rear wall 33 of housing 30 adjacent each cylinder 121 and its associated stem 123. When the hirth ring 116 is in the position as shown in FIG. 3, the stems 23 of the associated cylinders 121 effect operation of only one of the two switches in each housing 126—namely, switch 124; but when the hirth ring 116 is shifted by the associated cylinders 121 into a head locking position in which its teeth 116' engage the teeth of both the rings 110 and 115, the stems 123 of the associated cylinders shift (to the left of the position of the stem 123 as shown in FIG. 3) into an advanced position of which each stem 123 registers with and effects operation of both of the associated proximity switches 124 and 125, thus indicating that the head 31 is locked against rotation.

Figure 5:
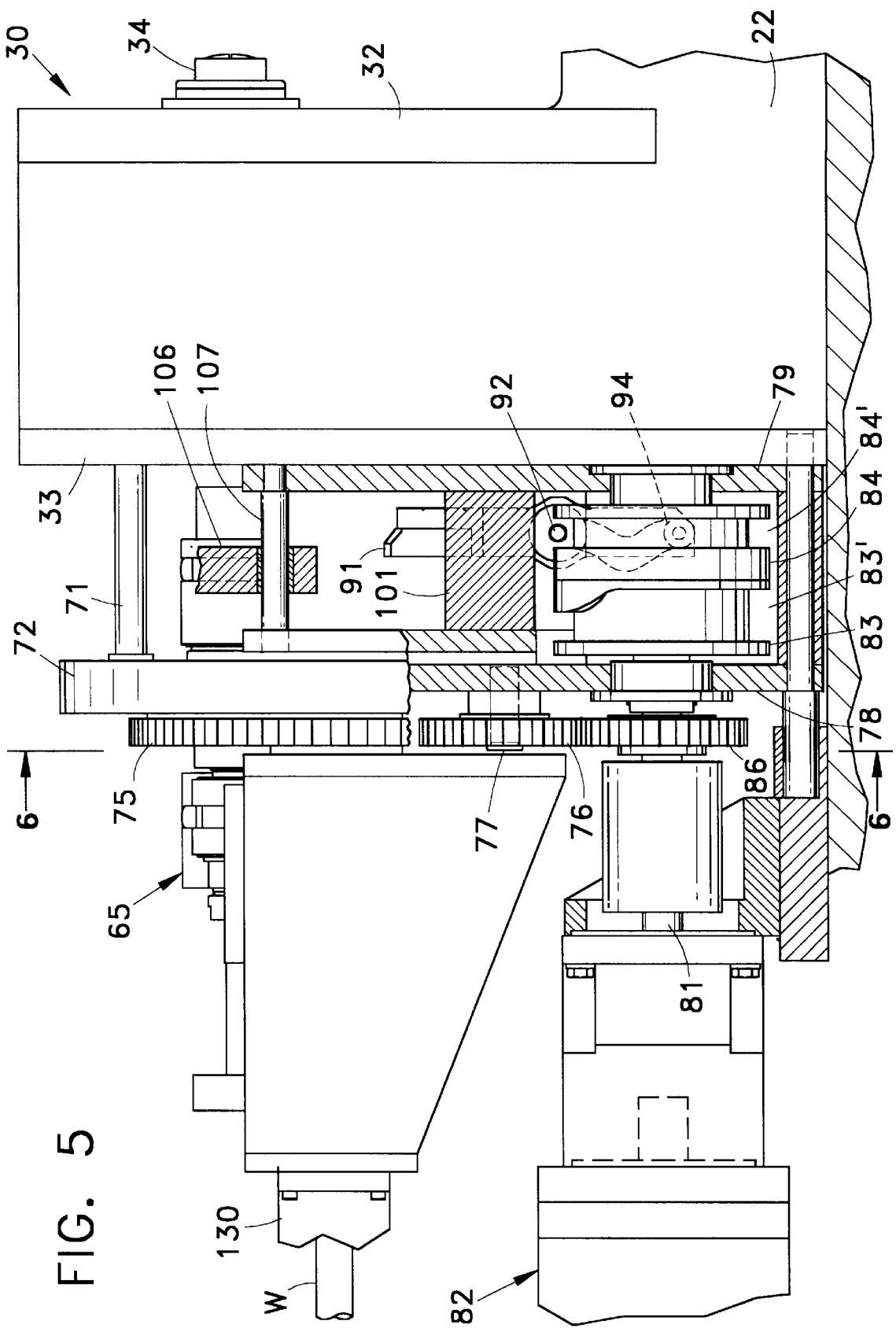
FIG. 5 is a fragmentary sectional view taken generally along the line 5—5 in FIG. 4 looking in the direction of the arrows.
Figure 6:
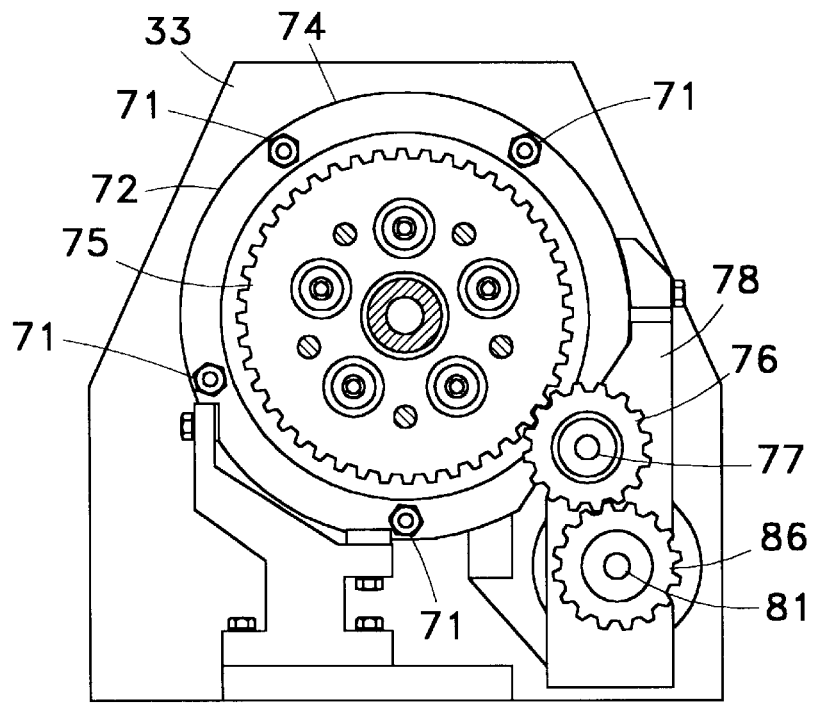
FIG. 6 is a fragmentary sectional view taken generally along the line 6—6 in FIG. 5 but on a smaller scale.

Referring again to FIGS. 1 and 5, the rotary servo motor or drive 82 may be of a type sold by Modicon Corporation, and in accordance with the present invention is programmed repeatedly to rotate the head gear 75 intermittently and successively through POS.1 to 5. As POS.1 is approached the cam track 84' causes the collet of the associated spindle 51 to be closed over the work W carried by that spindle; and as the servo drive 82 rotates the head 31 from its position POS. 4 to POS. 5, the cam way 83' causes the collet 52 of the associated spindle to be shifted to its open position. At this time, a linear servo motor or drive 130 (FIG. 5) which may be of the same design as the servo motors 46 (FIG. 2), and which may be purchased, for example, from Exlar Corporation, operates a bar feeder mechanism in the assembly 65 in order to shift a piece of bar stock or work W, as shown in FIG. 5, axially through the associated feed tube 63 until the work engages and is stopped by a stop plate S, which is shown fragmentarily in FIG. 3. As soon as this occurs the associated inner spindle 51 and its associated collet chuck 52 are retracted to the work gripping position as shown in FIG. 3. The inner sleeve 63 is thereafter retracted by the servo motor 130, but its collet shaped forward end 64 merely slides relative to the work W, which is at that time secured against axial movement by its associated collet chuck 52.

Secured by a bracket 141 (FIG. 4) to the rear face of housing 72 is a photo sensor or electronic counter 142, which is disposed to register with a notch 143 formed in the outer peripheral surface of the rotatable head support 74, each time the head completes one revolution. Thus, each time the notch 143 passes the inner end of the counter 142 a signal is produced to indicate that a revolution of the head 31 has been completed. At the start of an operation the rotary servo drive 82 causes the head 31 to rotate until a signal is produced by the counter 142. This indicates that the system is then ready to complete one or more operational sequences, with each sequence constituting one complete rotation of the head 31. During rotation of the head 31 the linear slide motors 46, which manipulate the cross slides for the tools T, are periodically operated to introduce and withdraw a respective tool T from a registering piece of work W projecting from the associated collet 54. Because of slight variations in the collets 54 and for that matter in the pieces of work W chucked therein, it is advisable when numerous, like products are to be produced by the above-described equipment, first to machine numerous sample pieces of the finished product. Those pieces are then carefully examined to determine whether or not they meet the desired specifications of the finished product, and if not, then prior to the commencement of continuous operation of the equipment, the various linear slides 46 are adjusted slightly or preprogrammed, to compensate for any errors noted during the examination of the sample products. In any case, the three proximity switches in each sensor index 47 supply the computer, which controls the machine operations, with three signals, one indicating when the associated tool slide 40 is fully retracted, another when the slide is fully advanced, and the third signal identifying an intermediate position of the slide.

In view of the foregoing it will be apparent that the present invention provides a substantially more accurate and easier method and means for controlling multiple spindle screw machines of the type described. Moreover, while this invention has been illustrated and described in detail in connection with certain embodiments thereof, it will be apparent that it is capable of still further modification, and that this application is intended to cover any such modification which may fall within the scope of one skilled in the art or the appended claims.

We claim:

1. In a multiple spindle screw machine having a frame, a spindle drive shaft mounted on the frame for rotation about a stationary axis, a spindle supporting head mounted on the frame for indexible rotation coaxially about said drive shaft, and a plurality of tubular work-supporting spindles mounted intermediate their ends in said head for rotation therewith and for rotation relative thereto by said drive shaft about spaced, parallel axes radially spaced from and angularly spaced about said drive shaft, the improvement comprising head indexing means including a first servo motor operable intermittently to rotate said head about said drive shaft, thereby to rotate said spindles successively into different angular positions about the axis of said shaft, locking means mounted for limited movement on said head between a first position in which said head is fixed against rotation relative to said drive shaft, and a second position in which the head is released for rotation by said indexing means, means for shifting said locking means from said first position to said second position just prior to each operation of said first servo motor, said locking means including a first ring secured to and surrounding said head adjacent said one end thereof, said second ring surrounding said first ring coaxially thereof and being fixed to said frame, and a third ring surrounding said head coaxially thereof in confronting relation to said first and second rings and for limited axial movement on said head toward and away from said first and second rings to first and second limit positions, respectively, and means on said third ring engagable with cooperating means on said first and second rings to lock said head against rotation upon movement of said third ring to said first limit position, and operative to become disengaged from said cooperating means upon movement of said third ring to its second limit position, thereby to release said head for rotation by said indexing means.

2. A machine as defined in claim 1, wherein each of said spindles includes a collet chuck movable between chuck open and chuck closed positions, respectively, and said head indexing means further includes chuck operating means interposed between said first servo motor and the collet chucks of said spindles and operative as each spindle approaches said one angular position thereof to move the associated chuck thereof to its open position, and to move said associated chuck to its closed position upon movement of its associated spindle to its next angular position.

3. A machine as defined in claim 2, wherein said head indexing means further comprises
   a first gear operatively connected to said first servo motor for intermittent rotation thereby, and
   a second gear secured to said head coaxially thereof and having the teeth thereof meshing with the teeth of said first gear, whereby intermittent rotation of said first gear is imparted to said head.

4. A machine as defined in claim 1 including spring means urging said third ring to one of its limit positions, and hydraulic means for moving said third ring to its other limit position.

5. A machine as defined in claim 1, including signal generating means operative to produce a signal each time a predetermined point on said head completes one revolution about said drive shaft.

6. A machine as defined in claim 1, including
   means including a second servo motor operative when each spindle reaches one of said positions to cause a piece of work to be advanced axially in a respective spindle so as to project at one end thereof a predetermined distance beyond one end of the associated spindle and one end of said head,
   a plurality of tool slide mechanisms mounted on said frame adjacent said one end of said spindle and said one end of said head, each of said mechanisms including a tool disposed to register with the work projecting from said one end of an adjacent spindle, and
   a further plurality of servo motors each being connected to a different one of said slide mechanisms and being operable selectively to move the tool of its associated slide mechanism respectively toward and away from the work projecting from the adjacent spindle.

7. A machine as defined in claim 6, including position sensor means associated with each of said tool slide mechanisms and operative to indicate when the tool of an associated slide mechanism is located in each of several different positions relative to work projecting from the spindle then adjacent to said tool.

8. In a multiple spindle screw machine having a frame, a spindle drive shaft mounted on the frame for rotation about a stationary axis, a spindle supporting head mounted on the frame for indexible rotation coaxially about said drive shaft, and a plurality of tubular work-supporting spindles mounted intermediate their ends in said head for rotation therewith and for rotation relative thereto by said drive shaft about spaced, parallel axes radially spaced from and angularly spaced about said drive shaft, the improvement comprising
   head indexing means including a first servo motor operable intermittently to rotate said head about said drive shaft, thereby to rotate said spindles successively into different angular positions about the axis of said shaft,
   each of said spindles having a collet chuck formed on said one end thereof, and being mounted for limited axial movement relative to said head between chuck opening and closing positions, respectively, relative to its associated chuck,
   means including a chuck operating sleeve surrounding each of said spindles adjacent the opposite end thereof for limited axial reciprocation thereon between a first limit position in which the associated spindle is moved to its chuck opening position, and a second limit position in which said associated spindle is moved to its chuck closing position,
   cam means including a pair of pivotal cam arms mounted on said frame adjacent said head for limited pivotal movement by said first servo motor each time said spindles are rotated into one of said angular positions,
   one of said arms being operative releasably to engage and move the chuck operating sleeve of a respective spindle to its first limit position each time the respective spindle is rotated into position thereof immediately preceding said one angular position thereof, and
   the other of said cam arms being operative releasably to engage and move the chuck operating sleeve of the respective spindle to its second limit position when said spindle is rotated into said one angular position thereof.

9. A machine as defined in claim 8, wherein said cam means further includes,
   a cam shaft connected to said first servo motor for intermittent rotation thereby about an axis parallel to the axis of rotation of said head, and
   a pair of cams mounted on said cam shaft for rotation thereby, each of said cams being connected to a different one of said cam arms to effect said pivotal movements thereof upon rotation of said cam shaft.

10. A machine as defined in claim 9, wherein said head indexing means further includes,
    a gear secured to said cam shaft for rotation thereby, and means connecting said gear to said head and operative upon rotation of said gear to effect said intermittent rotation of said head.

11. A machine as defined in claim 8, including
    means including a second servo motor operative when each spindle reaches one of said positions to cause a piece of work to be advanced axially in a respective spindle so as to project at one end thereof a predetermined distance beyond one end of the associated spindle and one end of said head,
    a plurality of tool slide mechanisms mounted on said frame adjacent said one end of said spindles and said one end of said head, each of said mechanisms including a tool disposed to register with the work projecting from said one end of an adjacent spindle, and
    a further plurality of servo motors each being connected to a different one of said slide mechanisms and being operable selectively to move the tool of its associated slide mechanism respectively toward and away from the work projecting from the adjacent spindle.

* * * * *